UNITED STATES PATENT OFFICE.

CARL DREHER, OF NIEDER INGELHEIM, GERMANY, ASSIGNOR TO C. H. BOEHRINGER SOHN, OF SAME PLACE.

LACTIC-ACID DYE.

SPECIFICATION forming part of Letters Patent No. 630,199, dated August 1, 1899.

Application filed January 27, 1897. Serial No. 620,861. (No specimens.)

*To all whom it may concern:*

Be it known that I, CARL DREHER, chemist, doctor of philosophy, of Nieder Ingelheim-on-the-Rhine, Germany, have invented new and useful Improvements in Processes of Preparing Solutions of Basic Artificial Coloring-Matters for Dyeing and Printing Purposes, of which the following is a specification.

Lactic acid and certain of its derivatives, and more particularly its acetyl derivatives and esters, easily dissolve a great many basic artificial coloring-matters which are difficultly soluble or even insoluble in ordinary solvents. The solutions so obtained can in many cases be directly utilized for dyeing and printing by the usual methods.

The solutions may be prepared in a concentrated form for sale or be prepared in each case before use.

The following illustrates the method of preparing the solutions of coloring-matters prepared according to this invention and methods of employing such solutions:

(A) *Solution of Basic Artificial Coloring-Matter in Lactic Acid.*

*Preparation of the solution.*—Twenty kilos of indulin B, soluble in spirit, are dissolved at a moderate heat in fifty kilos of lactic acid, ninety-three per cent.

*First. Printing of bleached calico.* — The calico is printed with the following printing-paste: twenty-five grams tannic acid, fifty grams acetic acid, seven hundred grams thickening of starch and tragacanth, seventy-five grams coloring solution above mentioned, one hundred and fifty grams water, dried, steamed for half an hour at one-half atmospheric pressure, fixed in a lukewarm bath containing five grams tartar emetic and five grams ground chalk per liter of water, and washed.

*Second. Printing of woolen cloth.*—The following printing-paste is employed for printing of wool prepared with chlorid of lime: six hundred grams gum-water, twenty-five grams sulfuric acid 66° Baumé, seventy-five grams solution of indulin, three hundred grams water, dried, steamed for one hour without pressure, and washed.

*Third. Dyeing of silk yarn.*—The boiled-off silk is entered at 80° Fahrenheit and worked by hand for about half an hour in a bath containing two hundred kilos water, fifty kilos boiled-off liquor well broken, with ten kilos acetic acid 6° Baumé, twenty-five kilos solution of indulin. The temperature of the bath is then raised within an hour to boiling-point and boiled for one-half hour, then washed and brightened in a fresh bath slightly acidulated with lactic acid.

(B) *Solution of Basic Artificial Coloring-Matters in a Derivative of Lactic Acid, Such as, for Example, the Ethylester of Lactic Acid.*

One kilo spirit indulin is dissolved by heating moderately in nine kilos ethylester of lactic acid.

From the foregoing it will be obvious that I can obtain a great variety of dyeing substances by dissolving basic artificial dyestuffs in lactic acid or its derivatives, and I would have it understood that wherever in the claims I refer to "lactic acid" I mean to thereby also include its derivatives.

With this understanding I claim—

1. The herein-described process of producing a substance suitable for dyeing, which consists in dissolving basic artificial dyestuff in lactic acid as and for the purposes described.

2. The herein-described dyestuff comprising lactic acid carrying a basic artificial dyestuff in solution.

In testimony whereof I have signed my name to this specification in the presence of two subscribing witnesses.

CARL DREHER.

Witnesses:
RICHARD WIRTH,
REINHOLD R. KINDY.